US007123876B2

(12) United States Patent
Wang et al.

(10) Patent No.: US 7,123,876 B2
(45) Date of Patent: Oct. 17, 2006

(54) EASY SET-UP, VEHICLE MOUNTED, IN-MOTION TRACKING, SATELLITE ANTENNA

(75) Inventors: James June-Ming Wang, San Marino, CA (US); ChauChin Yang, Los Angeles, CA (US); Wen Yen Lin, Arcadia, CA (US)

(73) Assignee: Motia, Pasadena, CA (US)

( * ) Notice: Subject to any disclaimer, the term of this patent is extended or adjusted under 35 U.S.C. 154(b) by 704 days.

(21) Appl. No.: 10/016,233

(22) Filed: Nov. 1, 2001

(65) Prior Publication Data

US 2003/0083063 A1 May 1, 2003

(51) Int. Cl.
*H04B 7/14* (2006.01)

(52) U.S. Cl. ...................... 455/25; 455/13.3; 455/13.2; 455/19; 455/63.4; 455/115.1; 455/115.2; 455/12.1; 342/354; 342/372; 342/373; 342/374; 342/359; 342/757

(58) Field of Classification Search ............ 455/67.16, 455/562.1, 12.1, 13.1, 276.1; 348/723; 342/457, 342/354, 463–465; 357/401–403, 407, 411; 364/434
See application file for complete search history.

(56) References Cited

U.S. PATENT DOCUMENTS

| | | | | |
|---|---|---|---|---|
| 5,119,501 | A * | 6/1992 | Perry et al. | 455/562.1 |
| 5,398,035 | A | 3/1995 | Densmore et al. | 343/713 |
| 5,452,869 | A * | 9/1995 | Basuthakur et al. | 244/164 |
| 5,528,250 | A | 6/1996 | Sherwood et al. | 343/711 |
| 5,739,784 | A * | 4/1998 | Jan et al. | 342/354 |
| 5,764,199 | A | 6/1998 | Ricardi | 343/911 |
| 5,917,310 | A | 6/1999 | Baylis | 322/1 |
| 5,961,092 | A | 10/1999 | Coffield | 248/539 |
| 5,982,333 | A | 11/1999 | Stillinger et al. | 343/766 |
| 5,983,071 | A | 11/1999 | Gagnon et al. | 455/3.2 |
| 6,049,306 | A | 4/2000 | Amarillas | 342/359 |
| 6,433,736 | B1 * | 8/2002 | Timothy et al. | 342/359 |
| 2002/0051091 | A1 * | 5/2002 | Dedieu et al. | 348/723 |

OTHER PUBLICATIONS

Article in Periodical I R E Transactions-Antennas and Propagation entitled “Virtual Source Luneberg Lenses” by Peeler et al., circa 1953, pp. 94-99.
Article in Periodical I R E Transactions-Antennas and Propagation entitled “Microwave stepped-index luneberg lenses” by Peeler et al., circa 1953, pp. 202-207.
Article in Periodical I R E Transactions-Antennas and Propagation entitled “A two-dimensional microwave luneberg lens” by Peeler et al., circa 1953, pp. 12-23.

* cited by examiner

*Primary Examiner*—Charles N Appiah
*Assistant Examiner*—Randy Peaches
(74) *Attorney, Agent, or Firm*—Patentry

(57) ABSTRACT

A low profile, vehicle mounted, in-motion tracking, satellite antenna includes a pair of antenna assemblies mounted in parallel on a rotatable platform. Each antenna assembly includes two subreflectors with a plastic matching element. The outputs of the two antenna assemblies are coupled with a single phase shifter. The combined outputs are retransmitted to a receiver inside the vehicle. The satellite antenna also includes a receiver for receiving channel selection data and/or for providing two-way communication with equipment inside the vehicle. The antennae, transmitter and receiver are self-powered by a storage device which is charged by a wind driven generator. A retractable radome lowers to a lower profile when the antenna is not in use.

13 Claims, 15 Drawing Sheets

EASY SET-UP, VEHICLE MOUNTED, IN-MOTION TRACKING, SATELLITE ANTENNA

BACKGROUND OF THE INVENTION

1. Field of the Invention

The invention relates to vehicle mounted satellite antennae. More particularly, the invention relates to a vehicle mounted satellite antenna which is easy to install, has a low profile, and which is operable while the vehicle is in motion.

2. State of the Art

It has long been known to mount a satellite antenna (dish) atop a vehicle for purposes of communicating with a geostationary or other type of satellite. The initial applications for mounting a satellite dish on a vehicle were military communication and remote television news broadcasting. Consequently, the first methods of mounting a satellite dish included a telescoping mast which was hingedly coupled to the vehicle. When the vehicle was in motion, the mast would be retracted and folded with the satellite dish lying end up on the roof or a side wall of the vehicle. The dish would be deployed only when the vehicle was stationary. Such a deployable vehicle mounted satellite dish is disclosed in U.S. Pat. No. 5,961,092 to Coffield. Until recently, no vehicle mounted satellite antennae were operable while the vehicle was in motion. The relatively large size of a conventional satellite dish antenna presents significant wind resistance if deployed on a vehicle in motion. This wind resistance adversely affects the operation of the vehicle and subjects the satellite dish to potential wind damage. Moreover, satellite dishes must be accurately aimed at a satellite within a relatively narrow aperture or "look window". In order to operate a satellite dish mounted on a vehicle in motion, it would be necessary to constantly re-aim the dish in order to maintain communication with the satellite.

Recently, satellite antennae have been developed which may be deployed on a vehicle and operated while the vehicle is in motion. Such antennae are disclosed in U.S. Pat. No. 5,398,035 to Densmore et al., U.S. Pat. No. 5,982,333 to Stillinger, and U.S. Pat. No. 6,049,306 to Amarillas. These antenna systems generally include a satellite antenna of reduced size and a solenoid system for aiming the antenna. The solenoid system is coupled to a feedback system and/or vehicle motion detectors in order to automatically re-aim the antenna as the vehicle is in motion. In order to reduce aerodynamic drag and protect the antenna from wind damage, an aerodynamic radome is often used to cover the antenna.

Vehicle mounted satellite antennae which are operable while the vehicle is in motion, can provide one-way or two-way satellite communications. Some applications for such antennae include satellite television reception, telephony in remote locations where cellular telephone service is unavailable, and broadband data communications. The application of television reception may be advantageously applied in common carrier transportation such as long distance buses, in recreational vehicles including boats, and in the rear seats of family mini-vans. The application of remote telephony may be applied in the same situations as well as in various other governmental and commercial settings. The application of broadband data communication may also be applied in many personal, commercial, and governmental settings.

Broadband satellite communication, such as television reception or broadband data communication, requires a high gain antenna with high cross-polarization isolation and low signal sidelobes. Satellite antenna gain is proportional to the aperture area of the reflector. Stationary satellite antennae typically utilize a circular parabolic reflector. Satellite antennae designed for use on a moving vehicle have a low profile. In order to maintain gain, these low profile antenna are short but wide so that the overall aperture area is kept high. However, this design strategy only works to a point. When the width to height ratio exceeds a certain value such as 2, the efficiency of the antenna is adversely affected. The presently available vehicle mountable satellite antenna for commercial and personal use are no shorter than approximately fifteen inches in height.

In addition to the issue of providing low profile tracking antennae, the process of installing a satellite antenna on a vehicle is not trivial. Holes must be drilled through the roof (or body panel) of the vehicle; coaxial cable must be routed from the antenna to a receiver or transceiver; and power cables must be routed to the antenna's tracking system. The installation process is therefore time consuming and costly.

SUMMARY OF THE INVENTION

It is therefore an object of the invention to provide a vehicle mountable satellite antenna.

It is also an object of the invention to provide a vehicle mounted satellite antenna which is operable while the vehicle is in motion.

It is another object of the invention to provide a vehicle mounted satellite antenna which has a low profile.

It is also an object of the invention to provide a vehicle mounted satellite antenna which has high gain.

It is another object of the invention to provide a vehicle mounted satellite antenna which has high efficiency.

It is still another object of the invention to provide a vehicle mountable satellite antenna which is easy to install.

In accord with these objects which will be discussed in detail below, the satellite antenna of the present invention includes two low profile paraboloid linear reflector antenna assemblies mounted on a rotatable platform which is rotatably coupled to a base plate. Each antenna assembly is provided with two sub-reflectors with a plastic matching element between them. The two antenna assemblies are mounted parallel to each other and are pivotable relative to the rotatable platform. A first servo motor is coupled to the rotatable platform for azimuth tracking. A second servo motor is coupled by a rigid arm to both antenna assemblies for elevation tracking. The two antennae assemblies are each provided with a line feed for receiving a polarized satellite signal. A number of slot antenna probes are located in the back of each antenna assembly. The signal is coupled from the slot antenna into a microwave PCB or waveguide in the back of each antenna. The antenna probes are attached to a microwave circuit board, where two orthogonal linearly polarized signals are extracted. The two linearly polarized signals are fed into a 90° hybrid and two circularly polarized signals are extracted. The signals of the same circular polarization from the same antenna assembly are amplified and combined into a single signal in a beam forming network (BFN) circuit on the microwave PCB.

In order to correct for time delay difference in the signals received by the two antenna assemblies, a phase shifter is employed to correct for the phase shift for the signal received from one antenna before it is combined with the other antenna. A unique feature of this antenna design is that only one phase shifter is required, thereby achieving a very low cost design as compared to the conventional phased array antenna implementation which typically requires a large number of phase shifters.

According to an alternate embodiment, the backside of each antenna dish is provided with a rectangular wave guide structure with a step tooth polarizer stud in the middle of the wave guide. The polarizer stud within the rectangular wave guide converts the signal from linear polarization to circular polarization. Each antenna contains two rows of multiple antenna feeds distributed over the entire length of the antenna. The upper row of antenna feeds extracts a (left or right) circularly polarized signal and the lower row of antenna feeds extracts a (right or left) circularly polarized signal. Each row of antenna feeds is connected via a circuit board or wave guide to a beam forming network (BFN) where signals are amplified and combined into a single signal. The output of one of the BFNs is connected to the input of a phase shifter via a flexible coaxial cable. The output of the other BFN is connected to either an attenuator or an amplifier (depending on whether the phase shifter amplifies or attenuates the other signal) and then to one input port of a two-to-one combiner via a flexible coaxial cable. The output of the phase shifter is connected to the other input port of the combiner. The amplifier or attenuator is used to amplify or attenuate the signal by the same amount as the gain or loss of the phase shifter so that the power of the signals from both BFN's are equal before they are combined.

Dividing the antenna physical aperture into two or more paraboloid linear dishes reduces the overall height of the antenna array by half. Providing each cylindrical dish with multiple feeds instead of single feed maintains the overall antenna efficiency.

The combined signal from the two paraboloid linear antennae is routed through a rotary joint, which routes the received signal to circuits located under the rotatable platform but above the base plate. According to the preferred embodiment of the invention, the circuits between the rotatable platform and the base plate include a re-transmitter for transmitting received satellite signals (at a longer wavelength) to a first receiver inside the vehicle. A second receiver is also preferably provided on the base plate. According to one embodiment of the invention, the second receiver is used to receive channel selection signals and other control signals transmitted by a transmitter inside the vehicle. According to another embodiment, a transceiver is used at the base plate to provide two-way wireless communication with equipment, such as telephones and computers, through another transceiver inside the vehicle.

The use of the re-transmitter and second receiver between the rotatable platform and the base plate eliminates the need for signal wiring between the antennae assembly and the interior of the vehicle. According to a preferred embodiment of the invention, an independent power supply is also provided between the rotatable platform and the base plate to eliminate the need for power wiring between the antennae assembly and the interior of the vehicle. According to one preferred embodiment, the independent power supply includes a storage device such as a battery or a coil and a charging device such as a wind powered generator. A solar cell array may also be used as a charging device.

According to other aspects of the invention, electronic dithering systems are used to track a satellite quickly while a vehicle is in motion. Methods are also provided for adjusting the bias of motion sensors via the use of longitudinal and lateral accelerometers. Methods are also provided for receiving either circularly polarized or linearly polarized signals. According to one embodiment of the invention, the "data port" of a conventional satellite receiver settop box is used determine the appropriate phase shift in the antennae array for a selected channel.

According to another aspect of the invention, the antenna system is provided with a retractable radome. When the antenna is not in use, the two cylindrical dishes are aimed straight up, decreasing the overall height of the system, and the radome is retracted.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
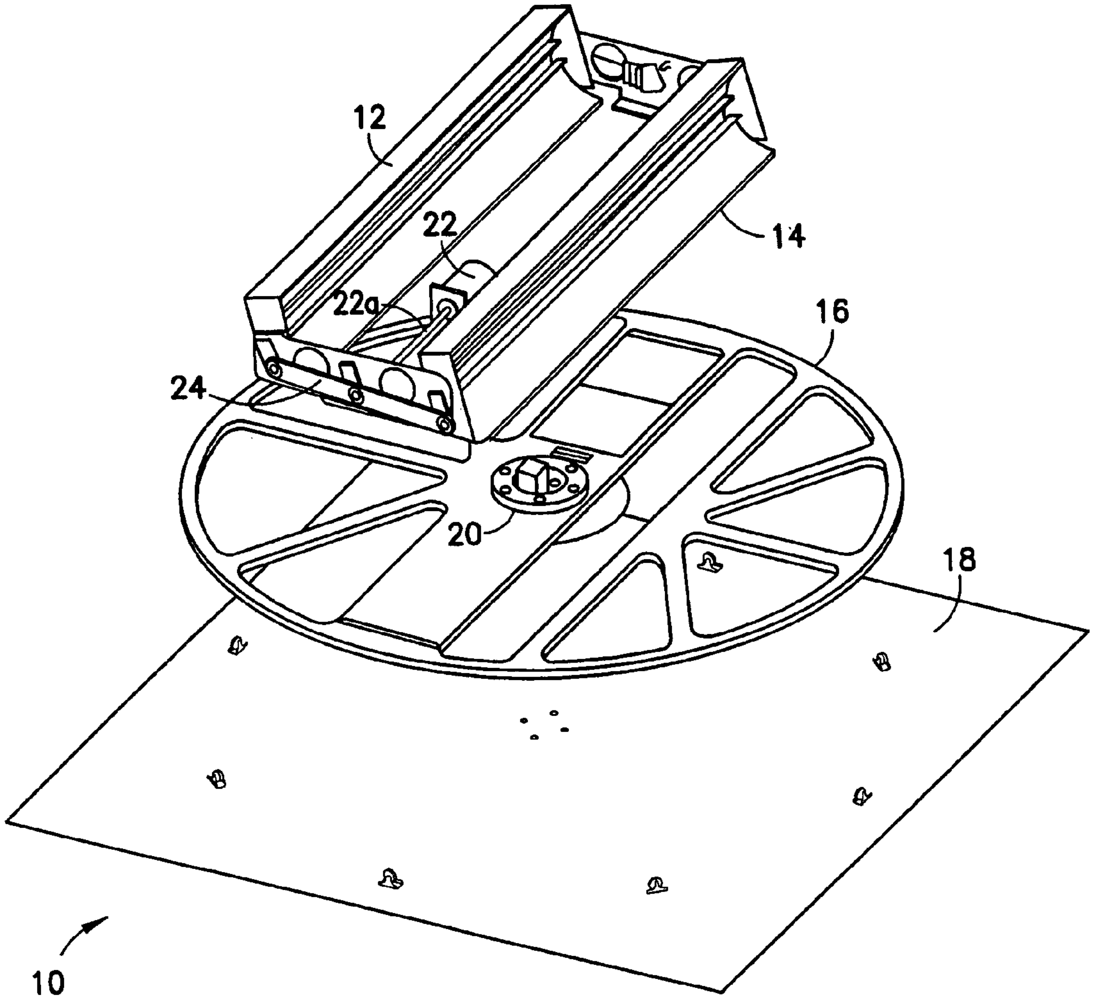
FIG. 1 is an exploded perspective view illustrating some of the major components of the invention.
Figure 2:
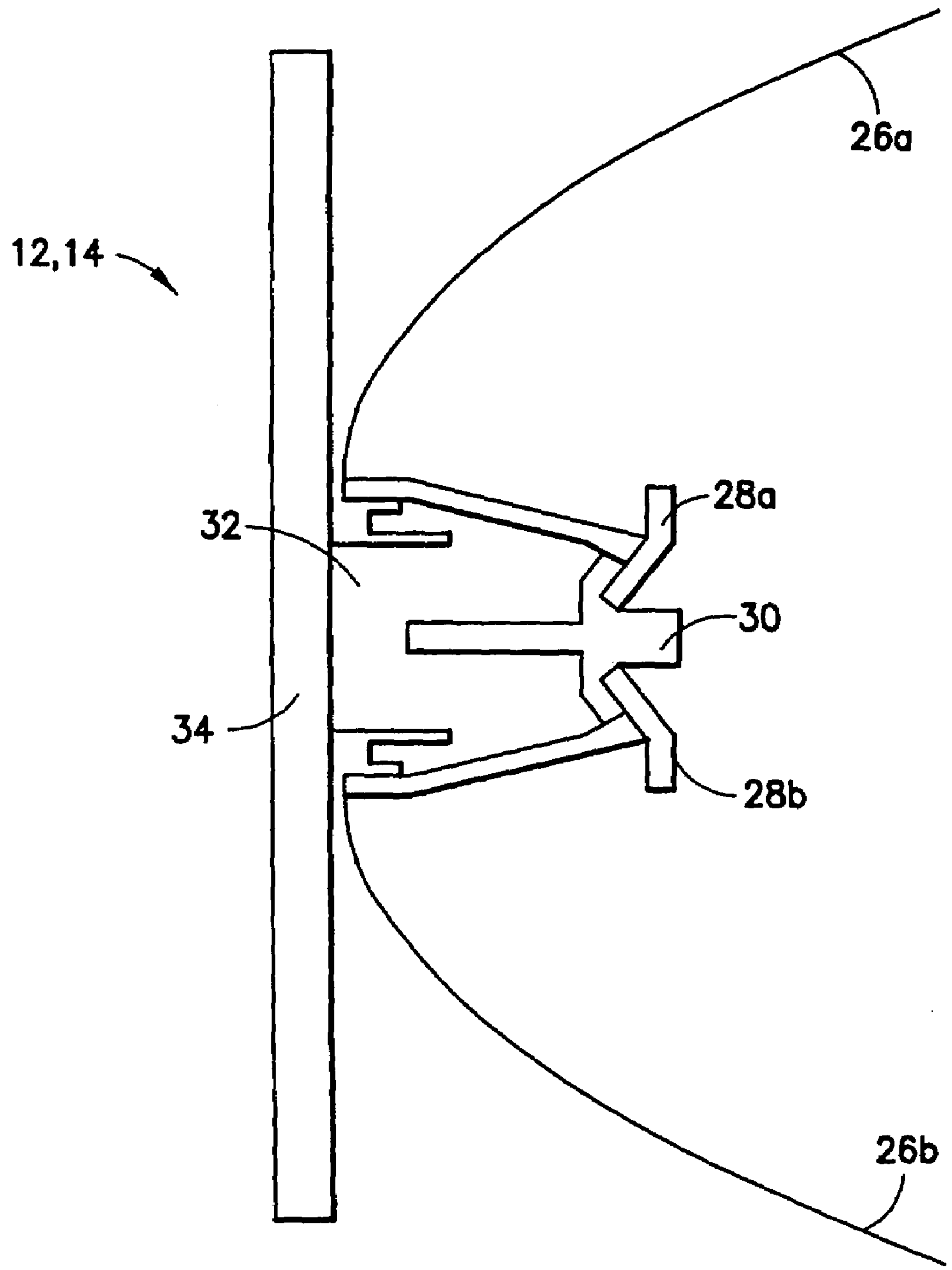
FIG. 2 is a schematic side elevation view illustrating the relative placement of reflectors and beam forming network.

Referring now to FIGS. 1 and 2, the satellite antenna 10 of the present invention includes two low profile paraboloid linear reflector antenna assemblies 12, 14 mounted on a rotatable platform (turntable) 16 which is rotatably coupled to a base plate 18 via a rotary joint and slip ring 20. The rotary joint is an off-the-shelf product which permits a high frequency signal to be conducted through a rotary joint. The slip ring consists of a number of circular traces on a circuit board and a corresponding number of “brushes” which contact the circular traces. The slip ring is used to conduct low frequency signals. The two antennae are mounted parallel to each other and are pivotable relative to the rotatable platform. A first servo motor (shown schematically in FIG. 7 as 114) is coupled to the rotatable platform for azimuth tracking. A second servo motor 22 (FIG. 1) is coupled by a rigid arm 24 (also shown in more detail in FIG. 8) to both antenna assemblies for elevation tracking.

Figure 1A:
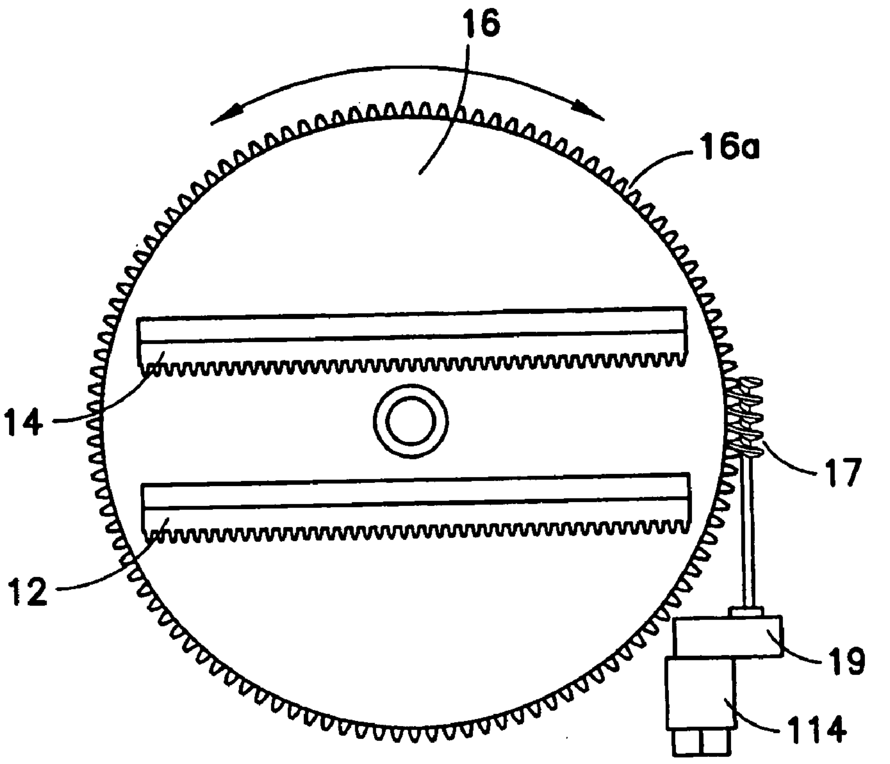
FIG. 1*a* ia a plan view of one embodiment of an azimuth turntable drive.

As shown in FIG. 1*a*, the presently preferred construction of the rotatable platform 16 contains a gear 16*a* which meshes on its circumference with a worm gear 17 fixedly mounted on a shaft, which is coupled through a gear box 19 to the rotary shaft of an azimuth drive motor 114. A rotary optical encoder (not shown) is coupled to the rotary shaft of the azimuth drive motor 114. The azimuth drive motor is fixedly mounted on the stationary base plate (18 in FIG. 1), and hence when it is energized for rotation in the forward or reverse direction, it turns the rotatable platform clockwise or counter-clockwise as viewed from the top, thus pointing the antennae to the left or right in the azimuth direction. The optical encoder delivers pulses corresponding to the amount of rotation in azimuth direction. The number of pulses is counted which allows a microprocessor which controls the azimuth movement of the rotatable platform to know the exact amount of platform movement in the azimuth direction. A magnet (not shown) mounted on the rotatable platform and a Hall effect sensor (not shown) fixedly mounted to the stationary base plate delivers a pulse to the microprocessor when the platform reaches a “Home” position.

Figure 1B:
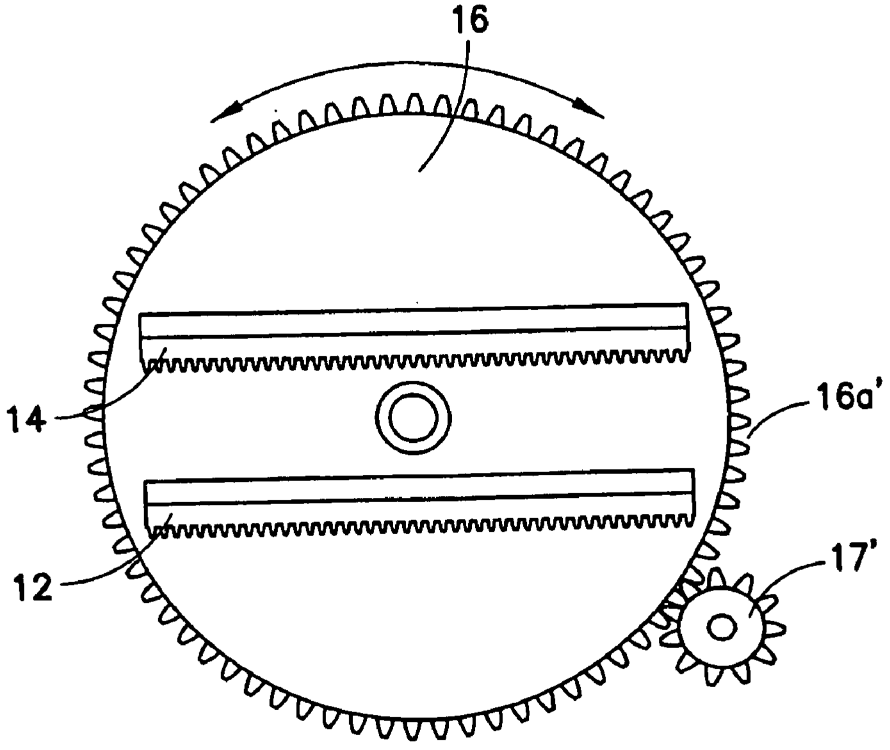
FIG. 1*b* is a plan view of an alternate embodiment of an azimuth turntable drive.

An alternative embodiment is shown in FIG. 1*b* where a spur gear 17' engages teeth 16*a'* on the perimeter of the turntable 16. The worm gear arrangement of FIG. 1*a* is preferred because it will inherently lock the turntable in position when the motor is stopped. If the spur gear embodiment of FIG. 1*b* is used, it is desirable to electrically shunt the motor when it is not running to thereby lock the turntable in position.

As shown in FIG. 1, the antennae 12, 14 are mechanically linked to a rotary shaft 22*a*. The rotary shaft 22*a* fixedly carries a gear (not shown) which meshes with a gear (not shown) fixedly mounted on the output shaft (not shown) of a gear box (not shown). The gear box includes an input shaft (not shown) which is engaged by the rotary shaft (not shown) of an elevation motor drive 22. A rotary encoder (not shown) is coupled to the rotary shaft of the motor. The elevation drive motor 22 is fixedly mounted on a support bracket on the rotatable platform 16. When the motor 22 is energized for rotation, it rotates the two antennae integrally in an upward or downward direction to point the antennae to the desired elevation angle. The rotary encoder delivers pulses corresponding to the amount of rotation in elevation direction. The number of pulses is counted which allows the microprocessor (112 in FIG. 7) which controls the elevation movement of the rotatable platform to know the exact amount of platform movement in the elevation direction. A magnet (not shown) mounted on the antenna and a Hall effect sensor (not shown) fixedly mounted to the rotatable platform delivers a pulse to the microprocessor when the antennae reach a “Home” position. Alternatively, a mechanical gimbal stopper and reed switch can be used to detect if the antenna reaches the gimbal limit.

As seen best in FIG. 2, according to a first embodiment, each antenna assembly 12, 14 includes a bifurcated main reflector 26*a*, 26*b* which focuses onto a pair of subreflectors 28*a*, 28*b* which are mounted on a plastic matching and support structure 30. The subreflectors focus onto a slot antenna 32 which is coupled to a beam forming network 34. In addition, signals from a satellite are free to pass between the two subreflectors. The dimensions of the antenna are such that the reflected signals and the direct pass through signal have a phase difference of 360° which makes them in phase with each other. This permits the signals to be constructively mixed thereby increasing the efficiency of the antenna as compared to a conventional Cassegrain antenna.

The two antennae 12, 14 are each provided with a line feed for receiving a polarized satellite signal. In the preferred embodiment, slot antenna probes (FIGS. 3 or 4) are located in the back of each antenna. The signal is coupled from the slot antenna into a microwave PCB or waveguide in the back of each antenna. The antenna probes are attached to a circuit board (FIGS. 3 or 4), where two orthogonal linearly polarized signals are both extracted from a circularly polarized satellite signal. The two linearly polarized signals are fed into a 90° hybrid and two circularly polarized signals are extracted. The signals of the same circular polarization from the same antenna are amplified and combined in the beam forming network 34. The antennae described herein can also be used to receive a linearly polarized satellite signal if the slot orientation is aligned with the polarization of the satellite signal.

Figure 3:
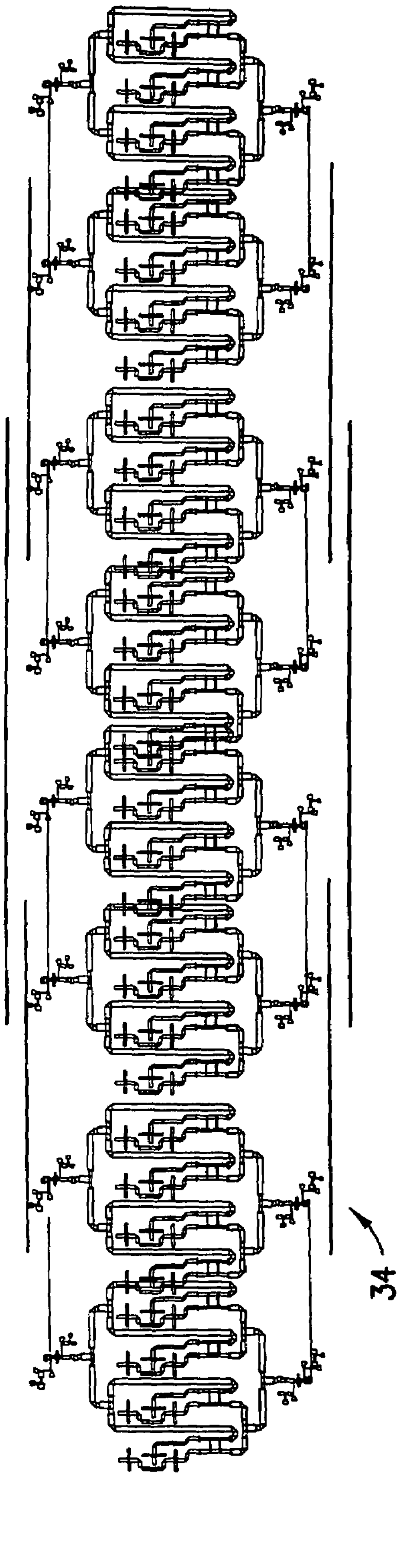
FIG. 3 is a schematic view of a thirty-two element beam forming network.
Figure 3A:
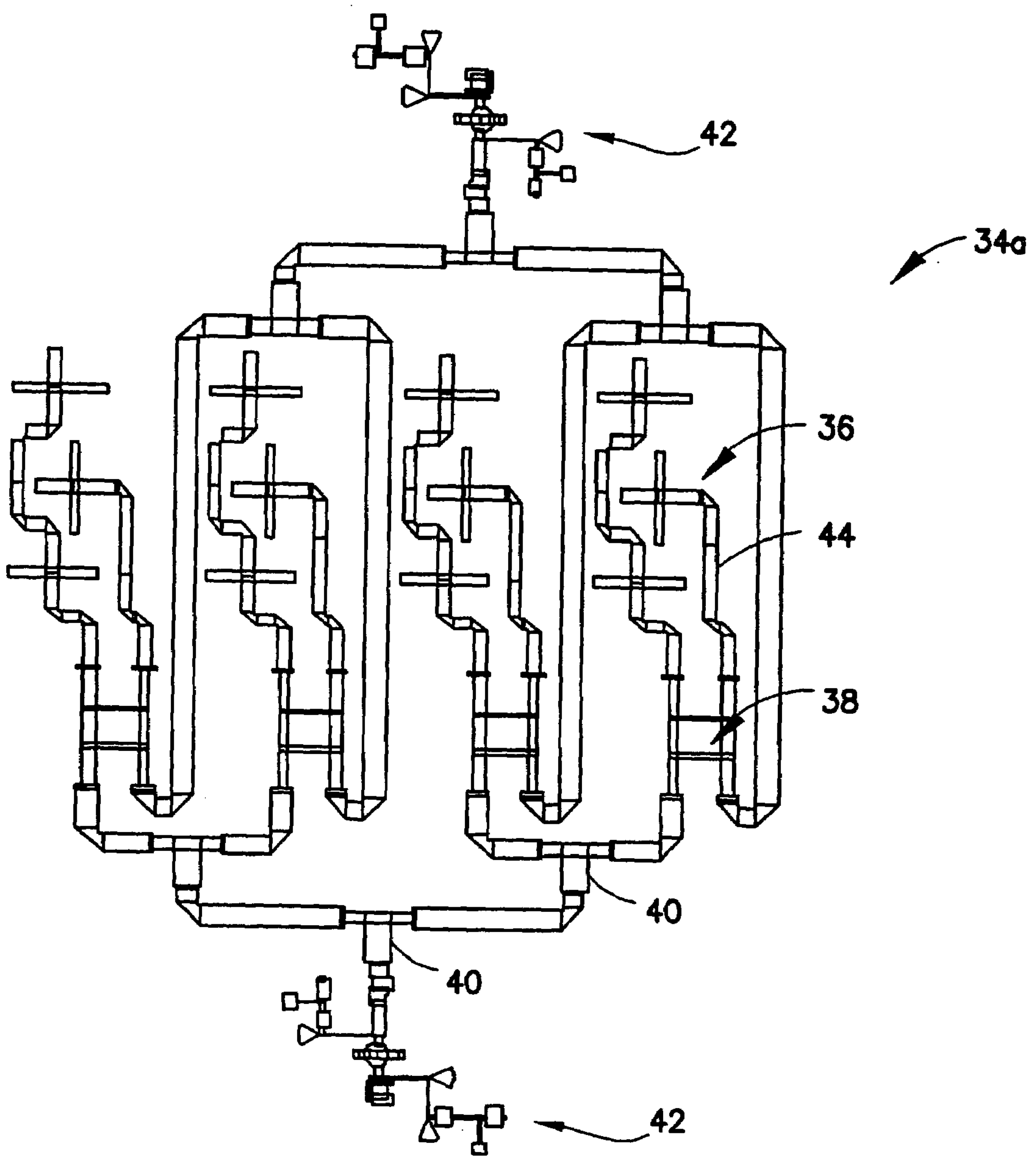
FIG. 3*a* is an enlarged view of a portion of FIG. 3 illustrating how four signals are combined before feeding the combined signals to a low noise amplifier.

Turning now to FIGS. 3 and 3*a*, an exemplary beam forming network 34 includes thirty-two elements in eight groups. Typically, the elements are placed less than one wavelength apart from each other in order to achieve the best efficiency. An enlarged view of one group 34*a* is illustrated in FIG. 3*a*. Each of the eight groups includes a high Z branchline coupler 36 to couple from the slot 32 (FIG. 2) to a microstrip 44. A high impedance hybrid 38 is employed to change the linearly polarized signals to circularly polarized signals. A quarter-wavelength impedance transformation is introduced before the hybrid. The impedance transformation allows a precise hybrid to be implemented at higher impedance. Implementing the hybrid at higher impedance can increase the signal loss slightly. However, the performance benefit gained from precise hybrid implementation significantly outweighs the increase in signal loss. After the hybrid, a T-combiner 40 is used to combine signals of the same circular polarization from two adjacent hybrids and feed the signals to amplifiers 42. FIGS. 3 and 3*a* show that four signals are combined and fed to each low noise amplifier (LNA) 42. The loss from the hybrid and combiners is approximately 0.5 dB. To reduce the loss, the LNA’s need to be placed closer to the hybrid. If the LNAs are placed before the T combiner, the loss will be reduced, but more LNA’s will be needed.

Figure 4:
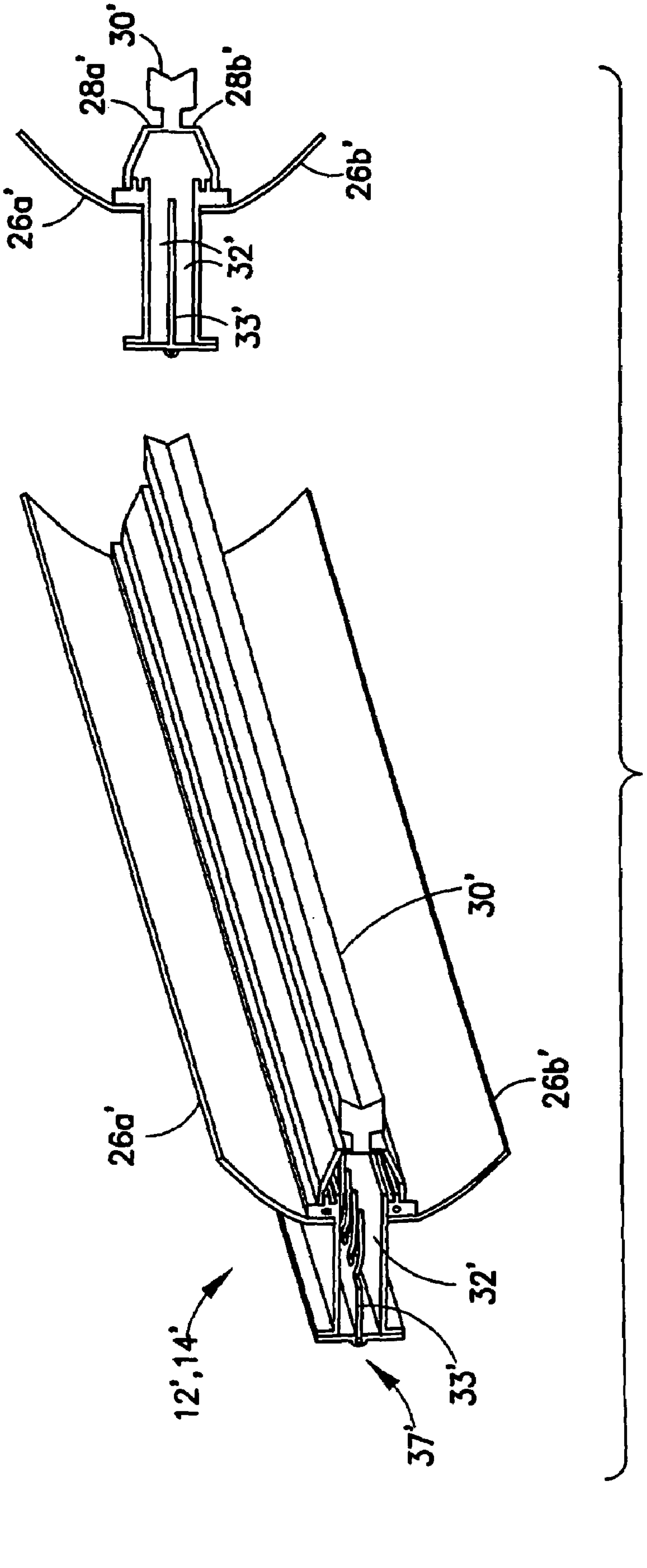
FIG. 4 is a perspective view of an alternate embodiment of an antenna assembly according to the invention.
Figure 5:
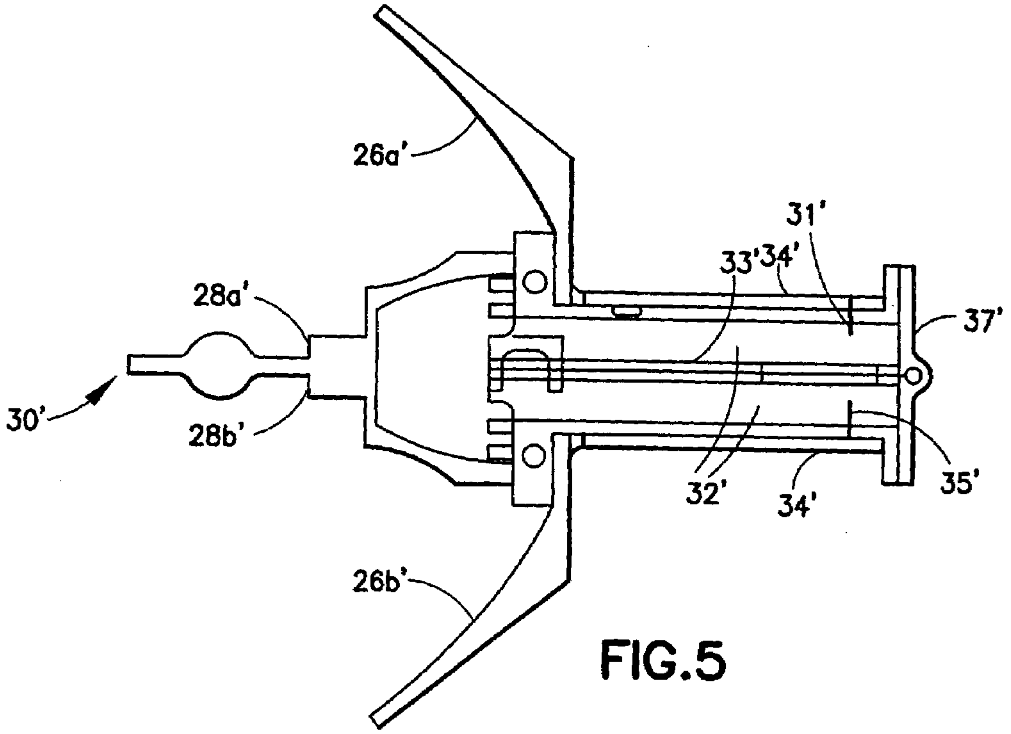
FIG. 5 is a schematic side elevation view of a portion of the assembly of FIG. 4.

FIGS. 4 and 5 show another embodiment 12', 14' of the offset paraboloid linear antenna with line feed. In this embodiment, the cylindrical dish 26' consists of two shallow curved surfaces 26*a'*, 26*b'* with two sub-reflectors 28*a'*, 28*b'* and plastic matching and supporting structure 30' in the center. As with the first embodiment, the use of two subreflectors (instead of one) increases antenna efficiency. According to this embodiment, a rectangular wave guide structure 32' is attached to the backside of the antenna dish. The wave guide contains a step tooth polarizer stud 33' in the middle of the wave guide. The polarizer stud 33' within the rectangular wave guide 32' converts the signal from linear polarization into circular polarization. The use of a waveguide polarizer to convert from linear polarization to circular polarization results in a simpler BFN 34' and much lower front end circuit loss.

Various pieces shown in FIGS. 4 and 5 can be extruded, molded, or stamped and assembled together. Each antenna contains two rows of multiple antenna feeds (probes) 31', 35' (located at one-quarter of a wavelength from the back plate 37') distributed over the entire antenna on the top and bottom plates of the waveguide 32'. The antenna feeds (small pins) 31' on the upper side of the antenna extract a (left or right) circularly polarized signal and the antenna feeds 35' on the lower side of the antenna the antenna extract a (right or left) circularly polarized signal. The multiple antenna feeds on the same side of the antenna are connected to circuit board or wave guide where signals from these probes are amplified and combined in the beam forming network (BFN) 34'.

In both the antenna assemblies shown in FIGS. 2 and 4, the antenna physical aperture is divided among two parabolic linear dishes, reducing the overall height by half. Each dish includes multiple feeds instead of a single feed, thereby maintaining the overall antenna efficiency. The antenna shown in FIG. 4 uses a polarizer to convert the circularly polarized signals directly from the antenna. This allows the use of a simpler beam forming network (BFN) 34' because no hybrid is used. This design also has lower front end loss and lower cost due to the reduced number of LNAs needed.

Figure 6:
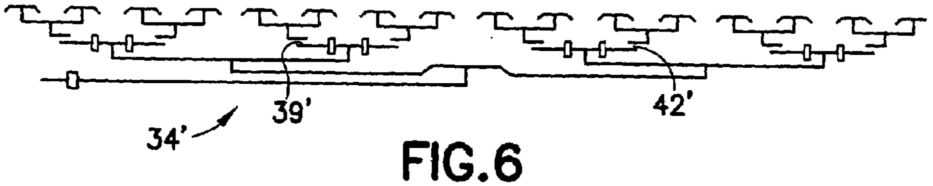
FIG. 6 illustrates an alternate embodiment of a beam forming network utilized with the antenna embodiment of FIGS. 4 and 5.

The BFN 34' suitable for use with the antenna assembly shown in FIG. 4 is illustrated together with a microstrip filter 39' in FIG. 6. The BFN 34' is simpler than the previous embodiment. No hybrid is needed because the signal extracted from the antenna probe is already circularly polarized. The elimination of the hybrid reduces the signal loss, reducing the required number of low noise amplifiers 42' and reducing the production cost. As illustrated in FIG. 6, a simple microstrip filter 39' is incorporated with the BFN 34'. This allows adjacent channel signal interference to be filtered out. A hybrid may be used in conjunction with the BFN to receive linearly polarized satellite signals.

Figure 7:
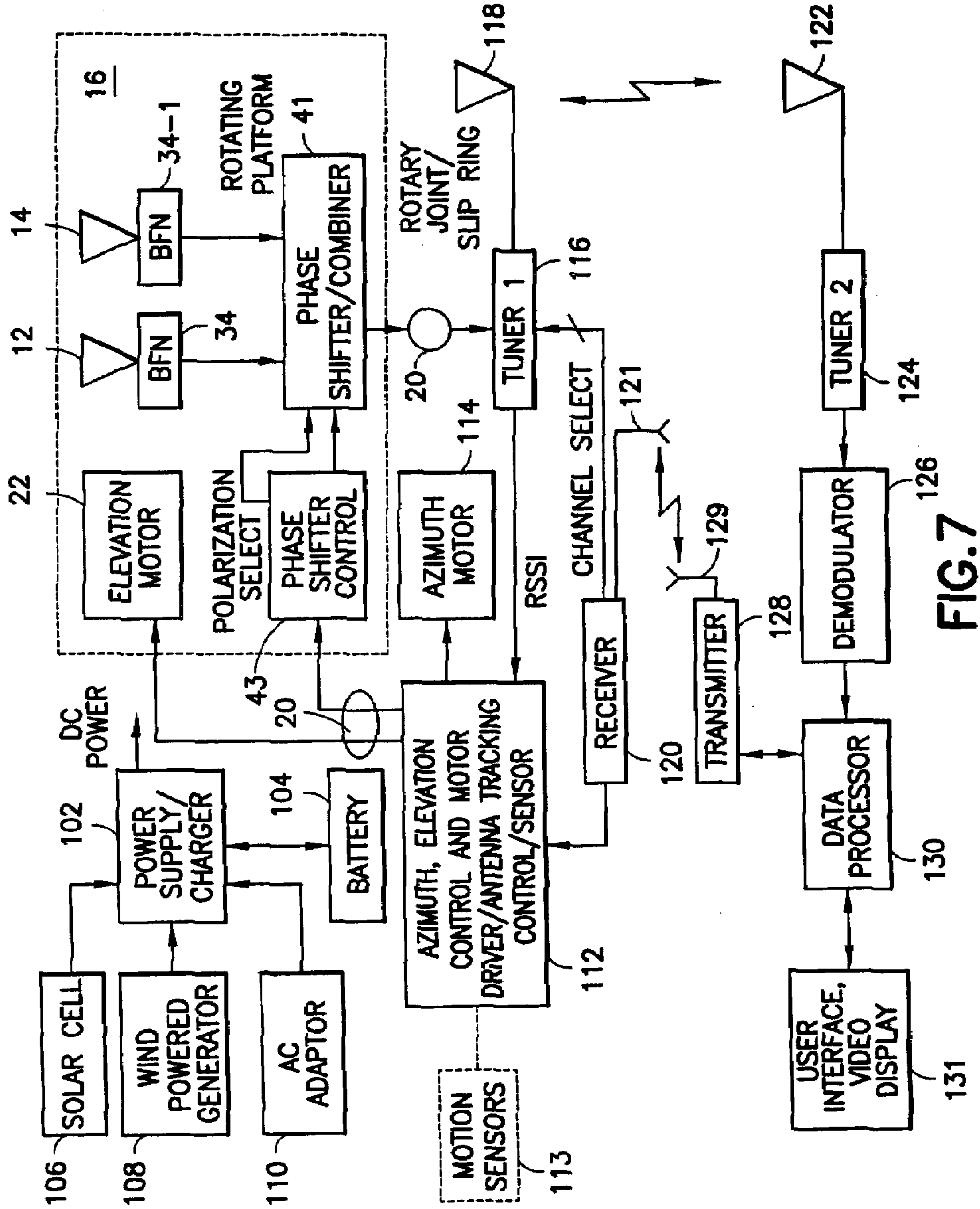
FIG. 7 is a simplified schematic diagram of a wireless retransmission system according to the invention.

FIG. 7 illustrates, in schematic block diagram form, a preferred embodiment of the present invention including all of the circuits and systems involved in providing satellite communications in a moving vehicle. The overall system 100 includes components which are mounted above the rotatable platform 16 (FIG. 1) as well as components mounted on the base plate below the platform. The components mounted above the platform are shown in FIG. 7 surrounded by a phantom line box. These components include the two antennae 12, 14, each having a beamforming network (BFN) 34, 34–1. As mentioned above, the outputs of the BFNs are coupled to a phase shifter/combiner 41. More particularly, the output of one of the BFN connects to the input of a phase shifter via a flexible coaxial cable. The output of the phase shifter is connected to one of the input ports of a two-to-one combiner. The output of the other BFN is connected to an attenuator or amplifier (not shown) to adjust the gain and then to the other input port of the combiner. The phase shifter is used to adjust the time delay or phase difference between the signal received by the two dishes. The attenuator or amplifier is used to attenuate or amplify the signal by the same amount as the loss or gain of the phase shifter so that the power of the signals from both BFN's are equal before they are combined. The output of the combiner 41 is passed via the rotary joint 20 to the retransmission tuner 116 located on the base plate below the rotatable platform. Also included above the rotatable platform are an elevation motor 22 and a phase shifter controller 43.

The connection of DC power and various control signals is effected via the slip ring 20. The preferred embodiment of the slip ring is a number of concentric circular traces on a circuit board surrounding the rotary joint and mounted to the rotatable platform. A corresponding number of brushes are mounted on another circuit board surrounding the rotary joint and mounted on the base plate. The brushes are preferably made from beryllium copper pins with brush blocks on their ends. The brush blocks are made from a phosphor bronze alloy with silver plating. The circuit boards are aligned so that each brush block contacts one of the circular traces.

The remainder of the components of the system 100 which are located on the exterior of the vehicle include a power supply/charger 102, a battery 104, a solar cell 106 and/or a wind powered generator 108, preferably an AC adaptor 110, tracking circuitry/microprocessor 112, an azimuth motor 114, a retransmitter 116, a retransmission antenna 118, and a receiver 120 having an antenna 121. The power supply 102 provides power to all of the components from the battery 104 and/or from a solar cell 106, wind powered generator 108, or AC adaptor 110. It will be appreciated that when power is available from the solar cell 106, wind powered generator 108, or AC adaptor 110, it may be used by the power supply 102 to charge the battery. It will also be appreciated that the AC adapter 110 is preferably included so that the battery not be depleted in situations where AC power is available, e.g. on a boat moored in a slip. The azimuth, elevation control and motor driver/antenna tracking control/sensor 112 control the azimuth motor 114 (rotating platform) and elevation motors 22 which points the antennas to the desired direction and keeps them locked on to a satellite. These circuits also control the phase shifter control 43 and receive RSSI (received signal strength indicator) input from both the retransmitter 116 (for satellite tracking) and the receiver 120 (for channel selection). As mentioned above, the retransmitter 116 retransmits signals received by the antennae 12, 14 via a different wavelength antenna 118 to a vehicle inboard unit (described below), and the receiver 120 receives signals via an antenna 121 from the vehicle inboard unit.

The vehicle inboard unit components are shown at the lower portion of FIG. 7. They generally include a receiver antenna 122 coupled to a receiver 124 which is coupled to a demodulator 126 which is coupled to a processor 130. The processor 130 is also coupled to a transmitter 128 which is coupled to a transmitting antenna 129. The receiver 124 converts the received signal to a frequency acceptable to the demodulator 126 and the demodulated data is processed in the data processor 130. The output of the data processor is passed to, e.g., a video display and a user interface 131. Commands entered via the user interface are decoded by the data processor 130, e.g. to determine which channel has been selected. This information is passed to the transmitter 128 and transmitted to the receiver 120. Based on that information, the receiver 120 instructs the tuner-retransmitter 116 to switch to a different channel and instructs the antenna and BFN to switch to different polarization. The circuits 112 control the azimuth and elevation motors which points the antennae to the desired direction. The sensor in these circuits senses the vehicle motion which allows the azimuth and elevation control to compensate for the vehicle motion by moving the antenna pointing in the opposite direction of the vehicle motion. In addition to motion compensation operation, the antenna tracking algorithm preferably dithers the antenna pointing direction to refine the antenna tracking. If the elevation pointing is adjusted, the phase shifter 41 needs to be adjusted accordingly to compensate for the difference in the path delay experienced by the signal via two antennae. This is done also under the control of the phase shifter control 43.

In order to point the antennae at the desired satellite position while the vehicle is moving, the antenna controller 112 (preferably embodied in a microprocessor) steers the antennae in both azimuth and elevation angle in response to motion sensors 113 to achieve motion compensation. The preferred embodiment uses accelerometers and yaw, roll, and pitch sensors to sense the yaw, pitch, roll rates, longitudinal and lateral acceleration of the vehicle. The estimated yaw, roll and pitch rates are integrated to yield the vehicle yaw, pitch, and roll angle. This is used in a coordination transformation to the earth-fixed coordinate system to determine the azimuth and elevation travel of the antennae. The antennae will be turned in the opposite directions by the same amount to counteract the vehicle motion. Any resulting pointing error is detected by a dithering process and corrected by the antenna tracking system 112. Drift due to the inertia bias is the most significant source of pointing error and the tracking system compensates for it with dithering.

The motion compensation is accomplished through the following azimuth (Az) and elevation (El) update Equations (1) and (2).

$$Az_{k+1}=Az_k-(\phi_x\cos(Az_k)\tan(El_k)+\phi_y\sin(Az_k)\tan(El_k)+\phi_z)\Delta t \quad (1)$$

$$El_{k+1}=El_k-(-\phi_x\sin(Az_k)+\phi_y\cos(Az_k))\Delta t \quad (2)$$

where $Az_{k+1}$ is the new azimuth angle estimate relative to the vehicle body coordinate, $Az_k$ is the most recent azimuth angle derived from the motor encoder output, $El_{k+1}$ is the new elevation angle estimate relative to the vehicle body coordinate, $El_k$ is the most recent elevation angle derived from the motor encoder output, $\phi_x$, $\phi_y$, $\phi_z$ are the newest roll, pitch, yaw sensor outputs minus the estimated bias, i.e., $\phi_x=\phi_{x,raw}$−roll bias, $\phi_y=\phi_{y,raw}$−roll bias, $\phi_z=\phi_{z,raw}$−roll bias, and $\phi_{x,raw}$, $\phi_{y,raw}$, $\phi_{z,raw}$ are the raw output of the roll, pitch, yaw sensors, and $\Delta t$ is the update time interval.

For accurate motion compensation, it is important that the bias for each sensor be properly estimated and compensated. A simple way to estimate the roll and pitch bias according to the invention is to monitor the output of longitudinal and lateral accelerometers as follows. The acceleration on the longitudinal accelerometer is y=g sin (roll angle) where g is the gravity acceleration. If y is not changing, there is no roll angle change and the readout of the roll angle sensor is the bias in roll sensor. The acceleration on the lateral accelerometer is x=g sin (pitch angle) where g is the gravity acceleration. If x is not changing, there is no pitch angle change and the readout of the pitch angle sensor is the bias in pitch sensor. When the antenna has locked on and tracked the satellite signal, the estimate of the yaw sensor bias can be performed using either of the following pairs of Equations (3) and (4) or (5) and (6).

$$\text{Yaw Sensor Bias}=\Delta Az+\Delta El\tan(Az)\tan(El) \quad (3)$$

and $$\text{Pitch sensor bias}=\Delta El\sec(Az) \quad (4)$$

assuming that roll bias has been calibrated to zero, or, $$\text{Yaw Sensor Bias}=\Delta Az+\Delta El\cot(Az)\tan(El) \quad (5)$$

and $$\text{Pitch sensor bias}=\Delta El\csc(Az) \quad (6)$$

assuming that pitch bias has been calibrated to zero, where ΔAz and ΔEl are the antenna correction rates derived from monitoring the motor encoder output.

The bias calculation algorithm described above allows the biases in the roll, pitch, and yaw sensors to be continuously estimated and updated and removed from the measurements.

A preferred embodiment for the antenna controller 112 obtains an estimate of the pointing angle error by "mechanically dithering" the antenna position. An antenna pointing error estimate is then used to refine the antenna pointing with a close loop tracking operation. According to the antenna tracking algorithm, the antenna is dithered to the left, right, up, and down of the target by a certain amount. The received signal strength indicator (RSSI) is monitored during this dithering action to determine the pointing error of the antennae. The antennae pointing is then adjusted toward the direction of maximum signal strength to refine the antennae tracking.

According to a preferred embodiment of the invention, the antenna controller 112 obtains an estimate of the pointing angle error by "electronically dithering" the antenna position. Electronic dithering in the elevation direction is achieved by changing (incrementing or decrementing) the phase shift of the phase shifter by a certain amount. This is equivalent to moving the antenna beam (upward or downward) in elevation. Dithering in the azimuth direction is achieved by adding phase shift in the BFN. The signals from the antenna probes are split into two groups within the BFN, each containing signals from half the number of the probes. One group contains signals from one side of the BFN and one group contains signal from the other side of BFN. The signals within each group are amplified and combined into a single signal. One of the combined signals is passed through a phase shifter before combining with another signal. By adjusting (incrementing or decrementing) the phase shift through the phase shifter by a certain amount, the azimuth direction of the antenna beam can be dithered.

Although the electronic dithering is achieved by adjusting the phase shift of the phase shifter, the electronic dithering is different from the conventional phased-array antenna where the electronic beam can be steered via the use of the phase shifters. The key difference between the electronic dithering operation and the operation of a phased array antenna is that the former only needs to move the antenna beam by a small amount while the latter needs to steer the antenna beam toward all possible scan angles to target a signal source. The design and implementation of the "electronic dithering" antenna and the phased array antenna are therefore quite different. The advantage of the "electronic dithering" is that the power required is reduced as compared to that required for constantly mechanically dithering the antenna assembly. A second advantage is that the "electronic dithering" can be performed at a much faster speed than the "mechanical dithering". Fast dithering operation means the antenna can track faster, which can eliminate the need for motion compensation and all the components (accelerometers and pitch, and yaw sensors) required by the motion compensation, resulting in a significantly lower cost implementation. It should be also noted that the "electronic dithering" operation described above is not limited to the present embodiment of the paraboloid linear antenna. The same principle can be applied to other type of antenna as long as there is a way of adjusting the phase shift to move the antenna beam to a slight offset angle with respect to the target pointing angle of the antenna.

When the antennae assembly is first powered up, the controller microprocessor 112 which controls the azimuth and elevation motors 114 and 22 commands the two motors to move and monitors the optical encoders to check if the two motors respond to the command. After that, the motion compensation algorithm is turned on. The antennae are moved to scan through possible satellite positions to search for a satellite signal. The typical method is to scan the 360 degree azimuth angle at a given elevation, incrementally change the elevation angle, and repeat the azimuth scan. Preferably, an electronic compass is utilized and the location of the satellite is known. Thus, it will not be necessary to scan the entire hemisphere, but only a relatively small region based on the accuracy of the compass and the satellite position. The antennae dither action is not turned on during the initial satellite location. The antennae controller monitors the RSSI via the power monitor. If the power monitor detects that the signal strength exceeds a certain threshold, the scanning is stopped immediately and the antennae dithering algorithm is turned on to allow the antennae to track the signal. The demodulator 126 and the data processor 128 are monitored to see if the antennae are pointed at the desired satellite and if the signal is properly decoded. If that is the case, the signal lock is achieved. Otherwise, the antenna dithering is disabled and the scanning is resumed.

If the signal lock is achieved, the antennae tracking algorithm continues to refine the antennae tracking. The processor which controls the motors continues to report the motor position with a time tag. In the preferred embodiment, the motor position is translated into a satellite position (elevation and azimuth) in space. In the case that the signal is blocked by trees, buildings, or other obstacles, the power monitor and the receive data processor can immediately detect the loss of signal. The antenna tracking algorithm will command the motor controller to move the antenna back to point at the last satellite position recorded, when the satellite signal was properly decoded. In addition, upon loss of signal, the antenna dithering tracking algorithm will be temporarily turned off. If the power monitor detects the signal power (exceeding some threshold) again or the data processor detects the signal lock again, the antenna dithering algorithm will be turned on again to continue tracking. After a certain time-out period if no signal strength exceeding the threshold is detected by the power monitor or the data processor does not detect signal lock, the antenna scanning algorithm will be initiated to scan for signal again. The antenna scanning algorithm for signal re-acquisition will scan in a limited region around the last satellite position recorded, when the satellite signal was properly decoded. If the scanning does not find the satellite signal, a full scan of 360 degrees of azimuth angle and all possible elevation angles will be conducted.

Depending on the elevation angle, the satellite signal will arrive at each antenna at a different time; the lower the elevation angle, the greater the difference in signal arrival time between the two paraboloid linear antennae. The phase shifter 41 is used to compensate for the signal phase difference between the received signals from the two paraboloid linear antennae such that the resultant phase of the two received signal is the same resulting in maximum combined power. If the phase shifter is not used to compensate the phase difference, the two resultant signal phases can differ by 180 degrees, the two signals can cancel each other, resulting in minimum power. The amount of phase shift in the phase shifter is determined by the elevation angle and the separation of the two antennas according to Equation (7) below, where D is the distance between the antennae, θ is the elevation angle, and λ is the wavelength of the received signal.

$$\phi(\text{in radians}) = D^*\text{COS } \theta/\lambda \quad (7)$$

The signal experiences different delays before it arrives at the different antennas. The difference in signal delays depends on the elevation arrival angle of the signal relative to the antenna. The phase shifter is used to compensate for the phase differences between the signals from the two (or more) antennas due to the difference in signal delays. The elevation angle information needed by the phase shifter is provided by the motion compensation and antenna tracking subsystem.

A typical satellite system has multiple frequency-division channels over the entire band. As an example, the Direct Broadcast Satellite (DBS) frequency band is from 12.2 to 12.7 GHz. The signal is transmitted via two antenna polarizations (left-handed circular and right-handed circular polarization). Each antenna polarization carries 16 transponder channels over the entire frequency band (12.2 GHz to 12.7 GHz). The satellite receiver/set top box receives only one (transponder) channel within the entire band at a time. The phase shift compensation required by each phase shifter will depend on which channel the user is receiving as shown in the Equation (8), $$\text{Phase Shift} = w_i{}^*\Delta\tau \quad (8)$$

where $w_i$ is the frequency of the user channel, and Δτ is the path delay. For the DBS example, the phase shift at the lowest channel (at 12.2 GHz) and the highest channel (at 12.7 GHz) with a path delay of around 7 inches differs by 106.7 degrees. Thus, it is necessary to know which transponder channel the user is viewing in order to compensate for phase shift properly.

The user channel information can be retrieved from the satellite receiver/set top box. In the normal operation mode of the satellite receiver/set top box, the user commands the satellite receiver/set top box via an infrared remote controller or front panel keypad. Most satellite receivers/set top boxes have an additional external data interface called the "data port" (or "low speed data port" for DBS specifically) which also allows the user to control the satellite receivers/set top boxes via a personal computer or similar device. According to one aspect of the invention, this data port is used to retrieve the user channel information so that the proper phase shift compensation can be applied to the antennae array.

The "data port" interface can override the remote controller and front panel keypad as the primary control for the satellite receiver/set top box. In this mode, the satellite receiver/set top box receives the user command from the "data port" but does not execute it. When the user commands the satellite receiver to select a specific channel, this user command information can be retrieved from the "data port". According to the invention, once the user command is retrieved from the "data port", the same command is looped back into the satellite receiver/set top box via the data port to be executed. Since the loop back time delay is very short, the set top box appears to be directly under the user command. The user command retrieved from the "data port" is parsed to decode which transponder channel the user has selected. This user channel information and elevation angle are used to compute the required phase shift to control the phase shifter. A detailed example of the operation flow for DBS set top box "low speed data port" interface is described below with reference to FIGS. 7*a* and 7*b*. Note that in the specific example, each transponder channel contains 4 or 8 video channels in time-division multiplex format.

Note that the user transponder channel decoded via data port can be passed to tuner1 116 of the re-transmitter and tuner2 124 to set the proper tuner frequency for the selected channel.

By using the "data port" in this manner, the "phased-array" satellite antenna can be operated with any off-the-shelf satellite receiver/set top box having a "data Port".

The implementation of a precise phase shifter over the entire operating temperature range and the operational life of the product is complicated and typically expensive. Another approach, according to the preferred embodiment, is to use a low cost, less precise phase shifter and, during signal reception, dither the phase shift to determine which phase shift produces the highest signal strength. The function of the phase shift control 43 is to perform such a dithering function and to monitor the output signal strength. It is expected that the optimal phase shift for a certain elevation angle will drift very slowly over time. Thus, the dithering operation of the phase shifter does not need to be repeated very often for a given elevation angle.

Figure 7A:
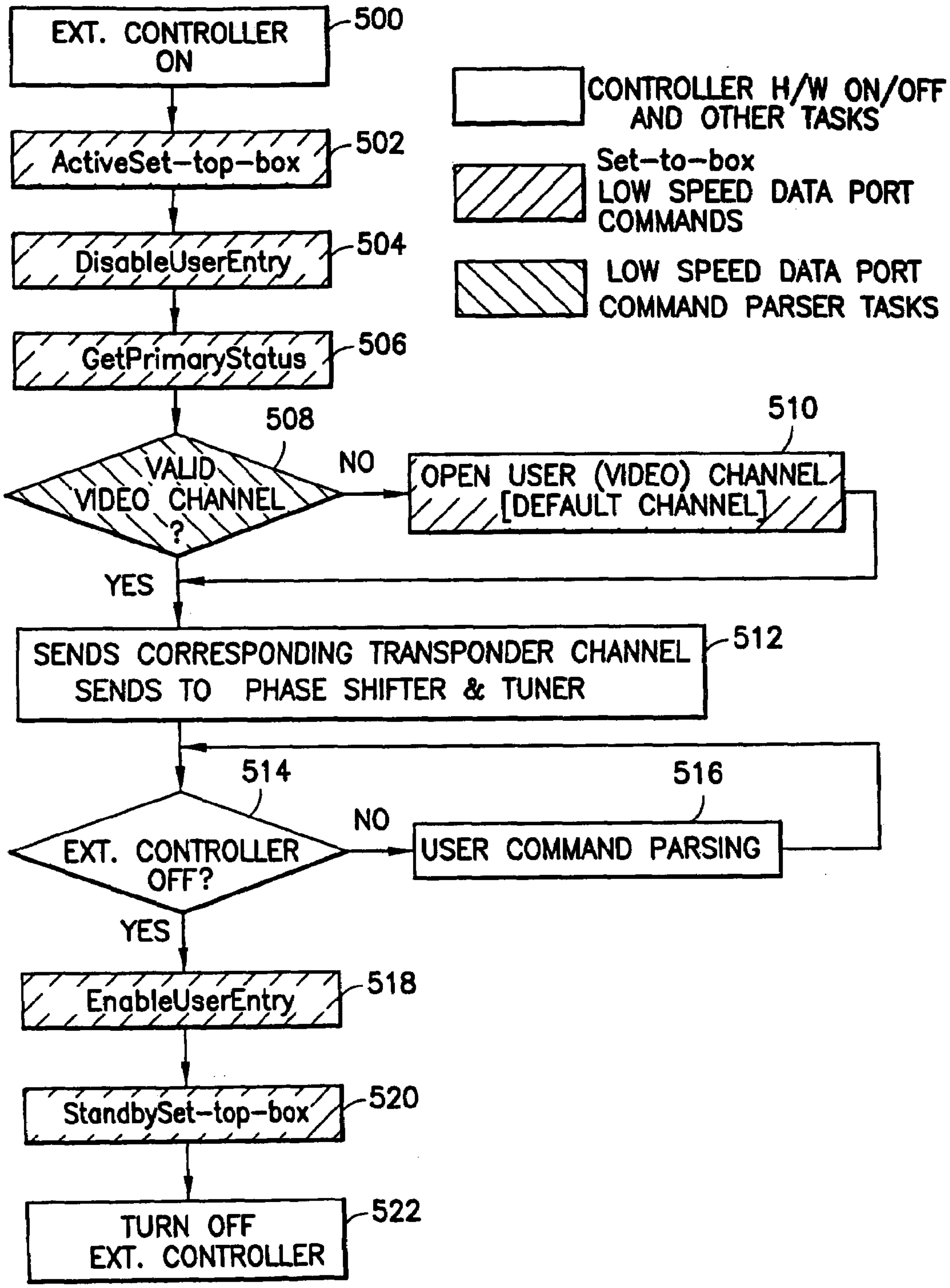
FIGS. 7*a* and 7*b* illustrate methods of the invention for determining appropriate phase shift for a selected channel.

Referring now to FIG. 7*a*, the hardware of the invention takes control of the settop box at 500, activates the set top box at 502, disables direct user entry at 504 and gets primary status at 506. The hardware of the invention monitors user channel selection at 508. If the user inputs an invalid channel, a default channel is selected at 510. At 512, the channel selection (or the default channel) is transmitted to the phase shifter and tuner for appropriate phase shifting and tuning. So long as external control is maintained as indicated at 514, the invention continues to monitor and parse user commands at 516 (further described below with reference to FIG. 7*b*). If it is determined at 514 that external control is to be turned off, direct user entry is enabled at 518, the set top box is put in standby mode at 520 and the external controller is turned off at 522.

Figure 7B:
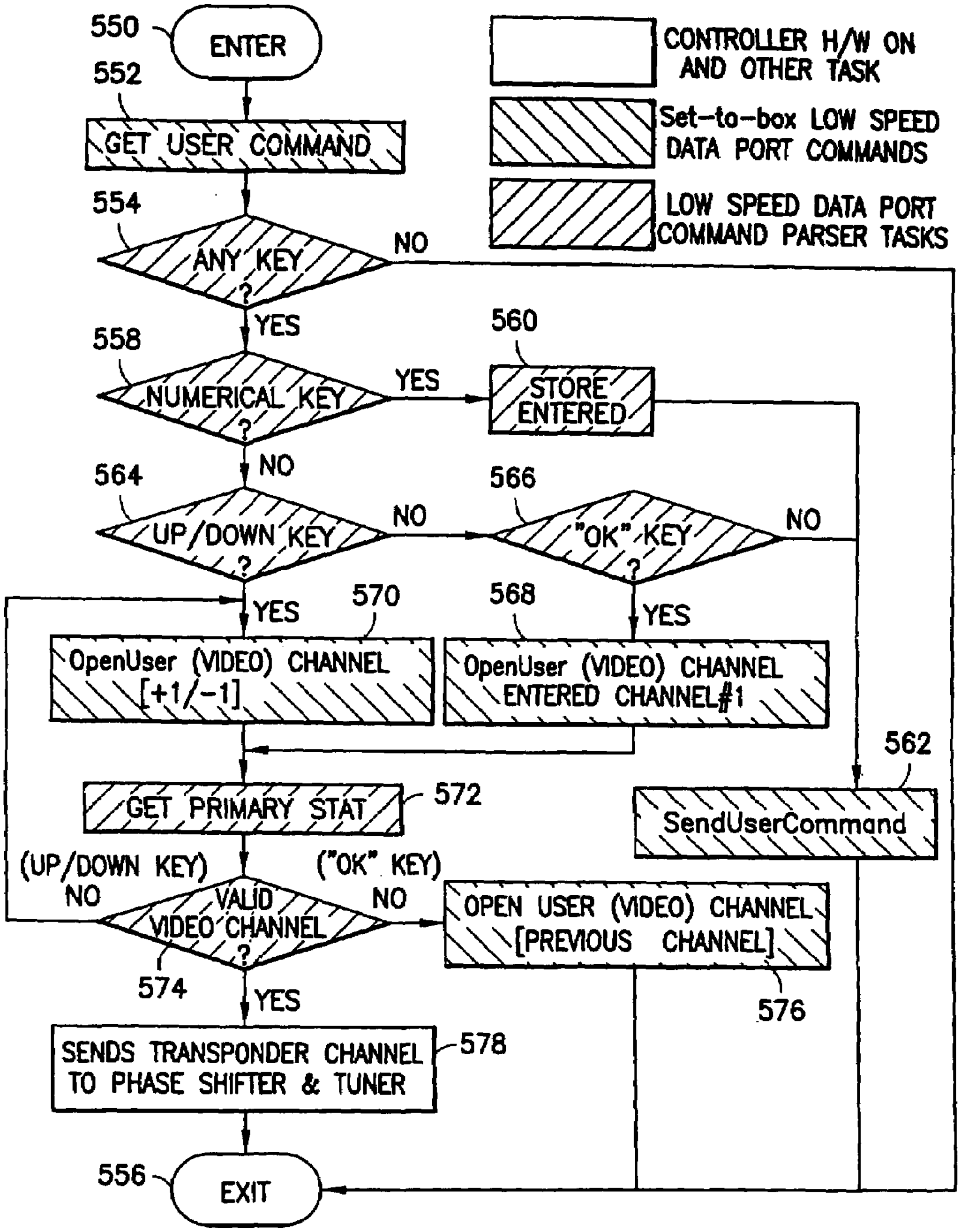

Turning now to FIG. 7*b*, the data port interface user command parsing starts at 550. A user command is obtained at 552. If it is determined at 554 that no key has been pressed, the function exits at 556. If it is determined at 554 that some key was pressed, it is then determined at 558 whether the pressed key is a numeric key. If the key pressed was a numeric key, the keypress is entered at 560 and the user command is sent at 562. If the key pressed was not numeric, it is determined at 564 whether the key pressed was an up or down key. If it is not an up or down key, it is determined at 566 whether it is the OK key. If it is the OK key, the video channel selected by the user is entered at 568. If it is determined 564 that the key pressed is the up or down key, the current selected channel is incremented (up key) or decremented (down key) at 570. Once the selected channel is determined it is stored at 572 and compared at 574 to determine whether the selected channel is a valid channel. If the channel is a valid channel, the channel ID is sent to the phase shifter and the tuner at 578. If the channel is invalid, either no action is taken (in the case of an up/down key) or the previous channel is not changed at 576 (in the case of the OK key).

Figure 8:
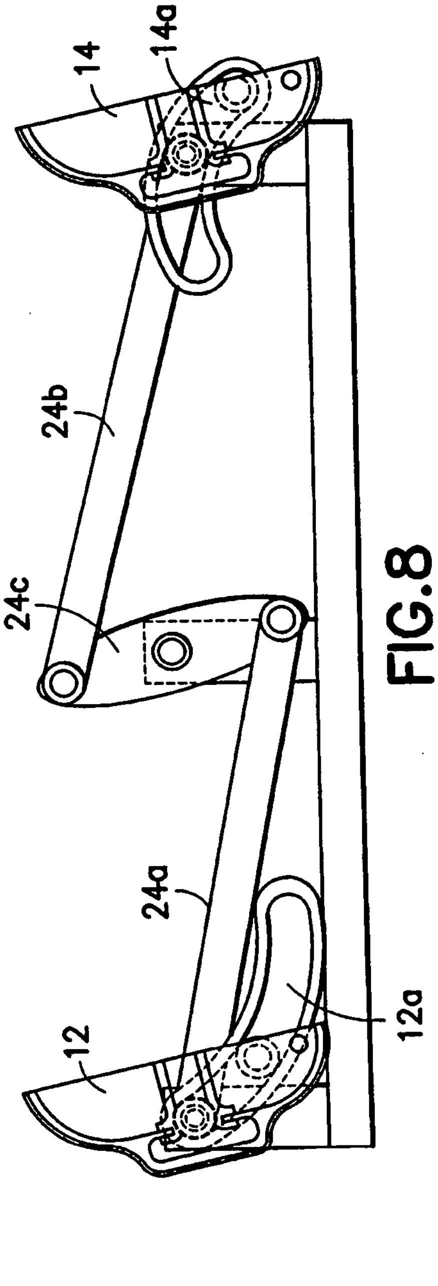
FIG. 8 is a schematic side elevation view of mechanical linkage coupling the two antennae for elevation tracking.
Figure 9:
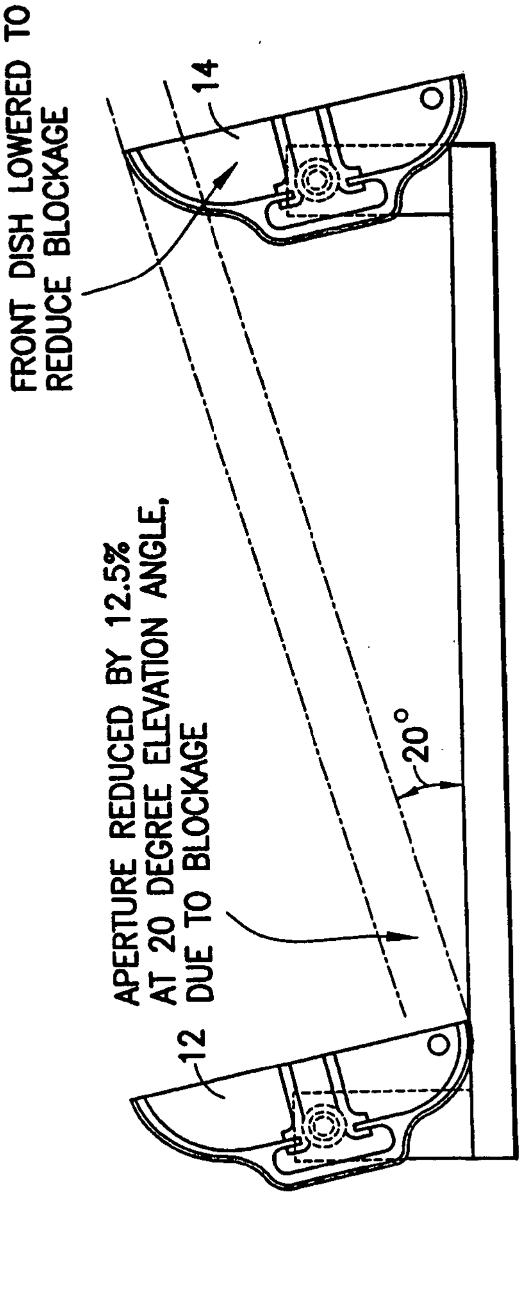
FIG. 9 is a view similar to FIG. 8 illustrating relative location of the antennae to minimize blockage.

Referring now to FIG. 8, the elevation of the antennae 12 and 14 is controlled by rigid arms 24*a*, 24*b* which are coupled to a crank shaft 24*c*. Each of the antennae is pivotally mounted and coupled to a closed track cam 12*a*, 14*a*. The ends the rigid arms engage the respective cams such that rotation of the crank shaft causes the antennae to pivot and change the elevation of their look window. In order to track a geostationary satellite from any location in the continental United States, the elevation of the antennae must be adjustable from approximately 15° to approximately 75°. The novel feature of the crank shaft configuration in FIG. 8 is that when the antennae 12, 14 look up due to the counterclockwise rotation of crank shaft 24*c*, the two rigid arms will pull the distance between two antennae closer along the (paraboloid-shaped) rails 12*a* and 14*a*. This has the effect of reducing the antenna sidelobe produced by the array factor as explained in more detail below. When the crank shaft rotates clockwise, the antenna look angle is lower and the distance between the two antennae increases. This prevents the antenna closer to the satellite from blocking the signal to the antenna farther from the satellite. Another simpler preferred embodiment is depicted in FIG. 9.

It will be appreciated that when the antennae are rotated away from an elevation of 90°, the antenna 14 will eventually block a portion of the look window of the antenna 12. As the antennae are rotated closer to the 15° elevation, the antenna 14 will block the look window of the antenna 12. In order to reduce blockage, the axis of the antenna 14 is located approximately one half inch lower than the axis of the antenna 12. With this arrangement, at an elevation of approximately 20°, the antenna 14 blocks the antenna 12 by approximately 12.5% as illustrated in FIG. 9. This arrangement also allows the two antennae to be located closer together thereby improving array pattern sidelobe performance.

Figure 10:
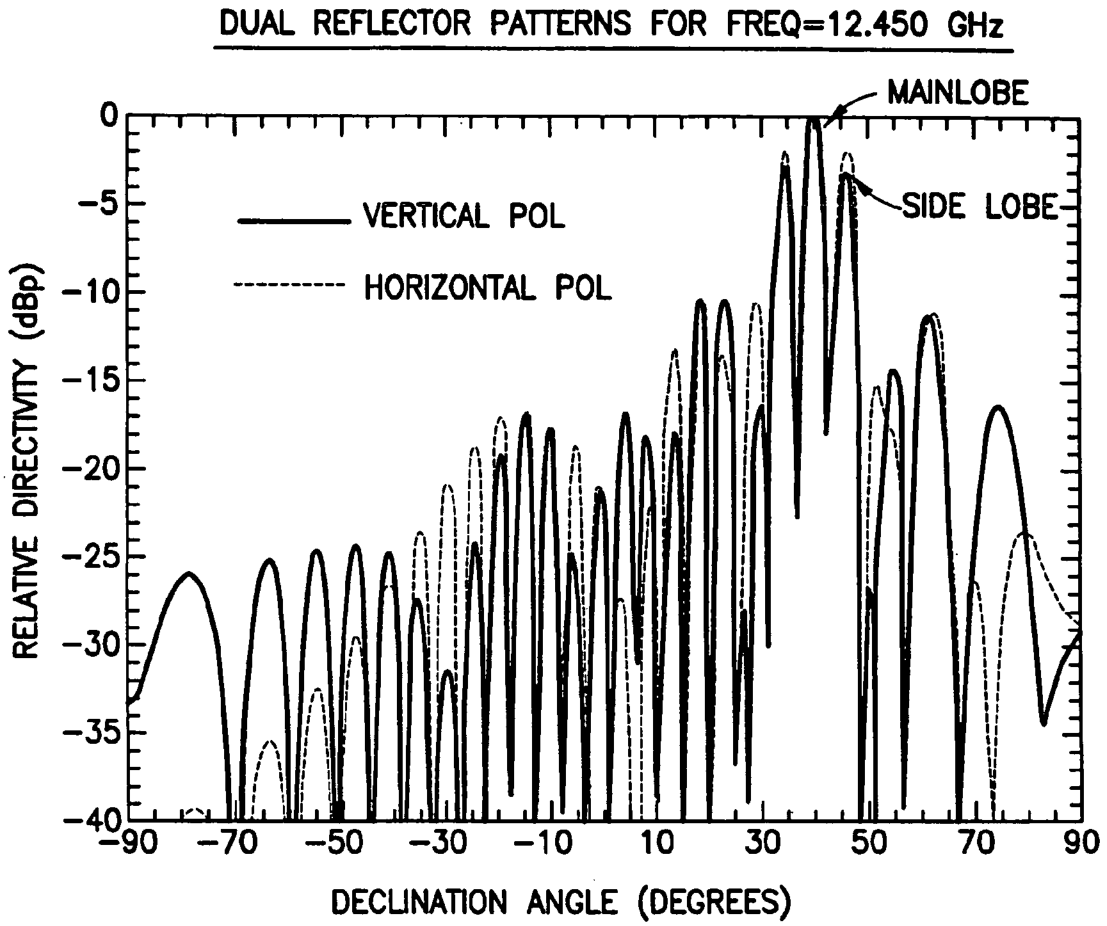
FIG. 10 is a graph of array pattern side lobe effects.

When the separation between the two antennae is larger, the blockage decreases. However, the array pattern sidelobe effects become more severe, when the two antennae are spaced farther apart from each other. In addition, the array pattern sidelobe effects becomes more severe when the antenna is pointing toward a higher elevation angle. FIG. 10 illustrate the array pattern sidelobe effects.

A potential problem due to the array pattern sidelobe is that the antenna may receive the signal from the sidelobe instead of the main lobe. This results in reduced antenna gain, causing the overall received signal-to-noise ratio to degrade. To reduce the array pattern effects at higher elevation, the two antennae need to be moved closer together. However, this will result in more signal blockage at lower elevation when the two antennas are closer. One solution to the array pattern sidelobe and blockage problem is to use the mechanical linkage as depicted in FIG. 8. When the crank shaft 24*c* turns, the cylindrical antennae slide through the rails 12*a*, 14*a*, thereby changing their elevation angle and the distances between them. The mechanical linkage allows the two antennae to move closer together when pointing at higher elevation and move farther apart when pointing at lower elevation. When the two antennae move closer, the array pattern sidelobe is reduced, alleviating or eliminating the array pattern sidelobe effects.

A different solution is to take some signal loss due to blockage at lower elevation, as illustrated in FIG. 9, to maintain the array pattern sidelobe. The illustration in FIG. 9 is based on the two antennae being separated by approximately 1.825 times the height of the antennae, e.g. for 4 inch antennae, the separation is 7.3 inches. This represents about 0.6 dB of signal loss and allows the highest antenna side lobe level to be lowered by an additional 4 dB relative to main lobe.

Another solution is to employ multiple motors to move the two antennae. Two motors are used to adjust the antennae elevation and a third motor is used to move one antenna closer to the other one, when the antennae are pointing at higher elevation angles.

Each of these three solutions simultaneously address the array pattern antenna side lobe issues and the blockage issues. The second solution allows a good compromise to be achieved.

As mentioned above, in order to avoid drilling through the vehicle, the signal received by the antennae is re-transmitted at a different frequency to a receiver inside the vehicle. This requires a downconverter and a local frequency source. The satellite signal is typically broadband (such as 500 MHz for DBS), carrying a number of relatively narrow band channels. The allowable bandwidth for re-transmitting the satellite signal into the vehicle is typically narrower, e.g. 100 MHz. The local frequency source is implemented with a tuner to select the desired portion (channel) of the satellite frequency band to be re-transmitted.

Figure 11:
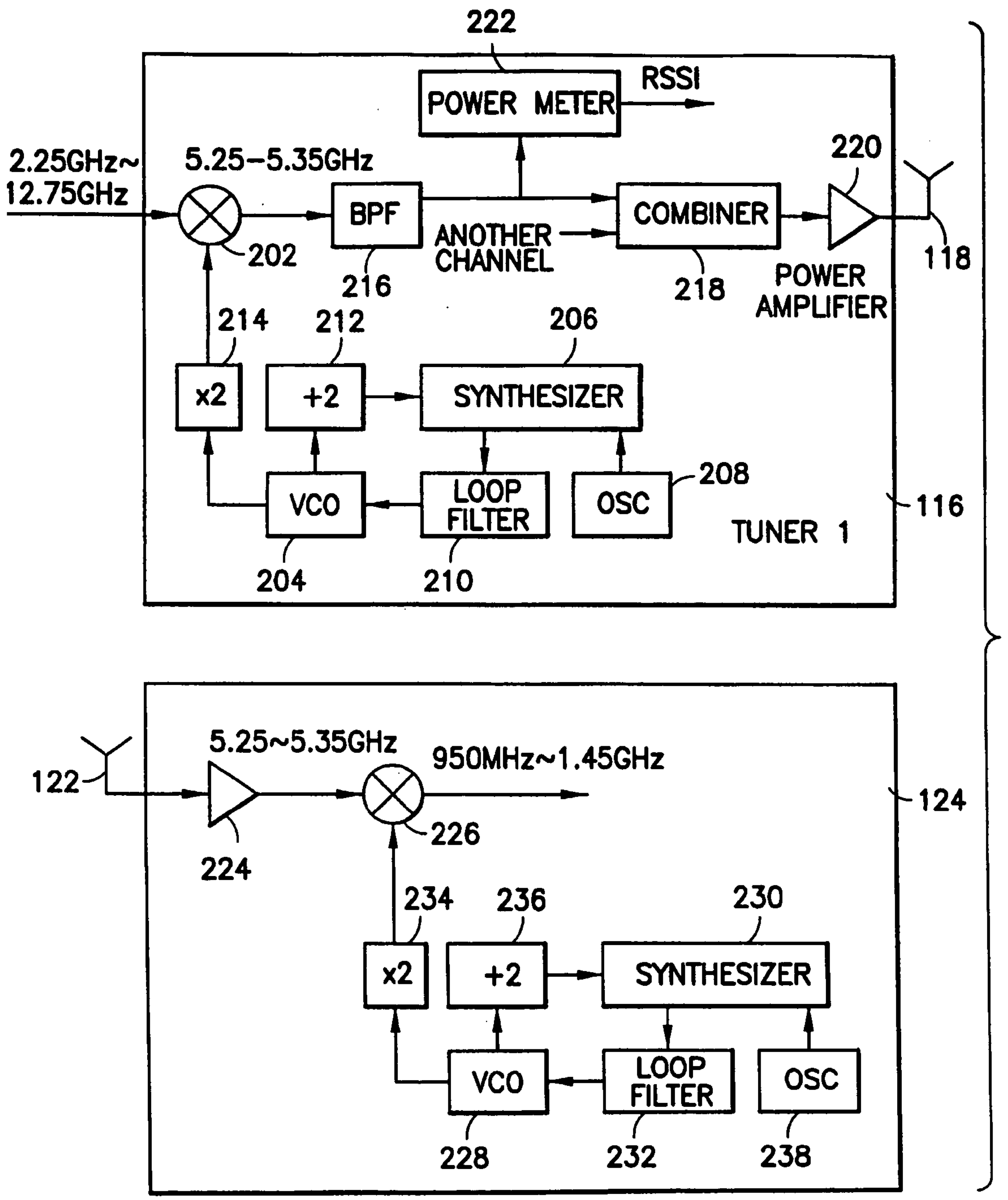
FIG. 11 is a simplified schematic diagram of a presently preferred embodiment of the two tuners of FIG. 5.

Presently preferred embodiments of a tuner/re-transmitter 116 and a receiver 124 are illustrated in FIG. 11. The tuner/re-transmitter 116 includes a mixer 202, a voltage controlled oscillator (VCO) 204, a synthesizer 206, an oscillator 208, a loop filter 210, a ÷2 divider 212, a ×2 multiplier 214, a bandpass filter (BPF) 216, a combiner 218, a power amplifier 220, and a power meter 222. The retransmitter 116 operates as follows. An incoming signal from the antennae 12, 14 (FIG. 1) has a frequency, e.g., in the range of 12.25–12.75 GHz and consists of a number of channels (e.g. 16 channels in each polarization) each having a bandwidth of approximately 30 MHz. The signal is downconverted to approximately 5.725–5.835 GHz (containing four channels) by the mixer 202 and passed through a bandpass filter 216 to remove three of the channels. The local oscillator feeding the mixer 202 is derived from a phase-locked loop (PLL) consisting of VCO 204, synthesizer 206, oscillator 208, loop filter 210, ÷2, and ×2. Through the action of the phase locked loop, the VCO frequency is coherently related to the oscillator frequency. The output of the VCO is multiplied by two through the ×2 multiplier 214 before it is fed into the mixer 202. The use of the ×2 and ÷2 in the illustrated embodiment allow the VCO to operate at a frequency resulting in the lowest overall phase noise. Alternate embodiments could use a combination of ×N and ÷M devices, where N and M are integer values. The phase locked loop also allows the local oscillator frequency to be changed. Different local oscillator frequencies allow different channels to be selected. The overall available bandwidth at 5.725~5.835 GHz is 110 MHz. This bandwidth permits multiple channels (e.g. up to three 30 MHz channels) to be transmitted simultaneously. This is done by routing the input 12.25 GHz~12.75 GHz signal also to another mixer and phase locked loop and bandpass filter (BPF) to select another channel. The bandpass filter for selecting the second channel is offset from the first one by at least 30 MHz. The resulting two 25 MHz channels are then combined with the combiner 218 into a single signal. The resultant signal is amplified by the power amplifier 220 and then transmitted out from the antenna 118 to the receiving tuner/receiver 124 inside the vehicle. The power meter 222 estimates the strength of the received signal. This is used in the antenna tracking algorithm to keep the antennae pointed in the right direction.

The receiver 124 is similar in design to the retransmitter 116. The receiver includes a low noise amplifier (LNA) 224, a mixer 226, a VCO, a synthesizer 230, a loop filter 232, a ×2 multiplier 234, a ÷2 divider 236, and an oscillator 238. The operation of the receiver is similar to that described above with respect to the retransmitter. The receiver receives the 5.25–5.35 GHz from the retransmitter and downconverts the signal to a lower frequency range (e.g., 950 MHz–1.45 GHz) which is then processed by the demodulator (126 in FIG. 7).

An alternative embodiment of a re-transmission scheme is to demodulate and decode the satellite signal. The signal transmitted by a satellite typically consists of a number of signals which are frequency division multiplexed (FDM) from 16 to 32 transponders in a satellite. A single channel satellite demodulator and decoder selects one transponder signal to process. The data carried by a transponder signal can be further broken down into multiple time division multiplexed (TDM) data streams. The multiplexed digital data streams are processed via a signal de-multiplexer and a router, and some of the data streams are retransmitted with off-the-shelf wireless LAN equipment such as IEEE 802.11a or 802.11b transceivers. The demultiplexer disassembles the desired data streams to be retransmitted and repackages these data streams into the format used by the 802.11 or Bluetooth transceivers. The router reassembles the reformatted data streams into the symbol stream to be re-transmitted and attaches the ID of the destination transceiver to the data stream. This method may be preferable if the satellite antenna is used for bidirectional data communications. The satellite communications can also be used as a backhaul network connection of the local area network (LAN) to the WAN (wide area network). It is also desirable in situations where a network of devices need to be coupled to the same satellite antenna.

Figure 12:
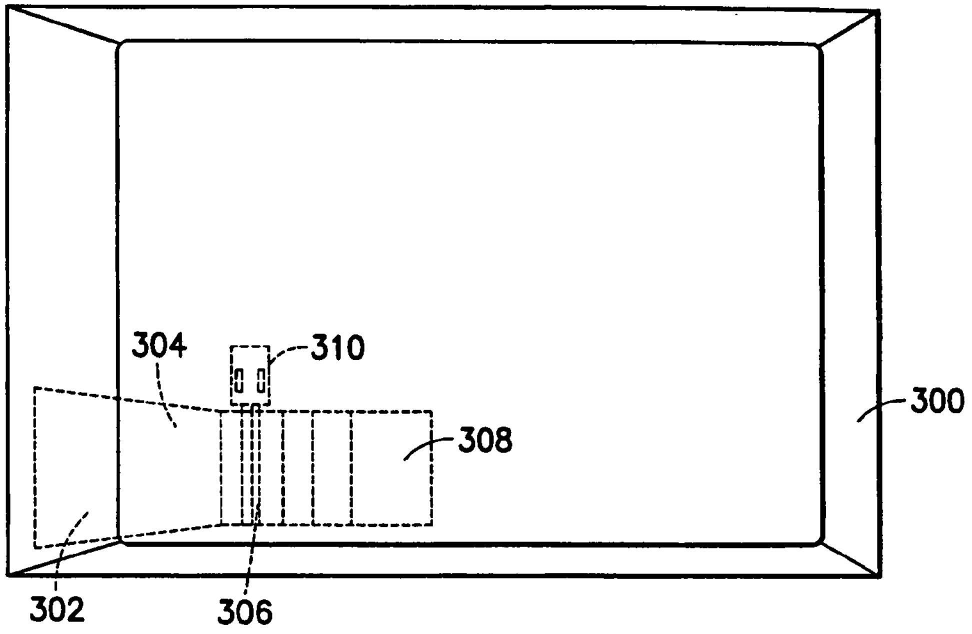
FIG. 12 is a plan view of a radome with a wind powered generator according to the invention.
Figure 13:
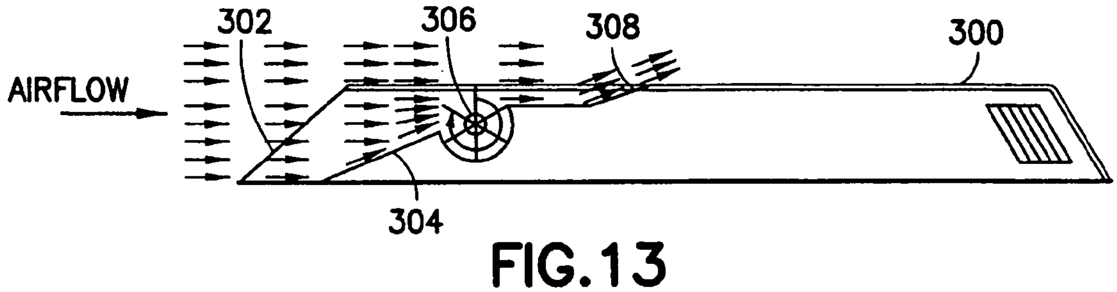
FIG. 13 is a partially cut away side elevation view of a radome with a wind powered generator according to the invention.

As mentioned above, the presently preferred power source includes a wind powered generator. FIGS. 12 and 13 illustrate a radome according to the invention incorporating a wind powered generator. The radome 300 is designed with a forward facing air intake 302, an air ramp 304 adjacent to the intake, an impeller 306 adjacent to the ramp, and an air exhaust 308. The impeller 306 is coupled to the shaft of a DC generator 310. When the vehicle is in motion, air enters the intake 302, is guided to the impeller 306 by the ramp 304, passes through the impeller 306 and exits through the exhaust 308. The air causes the impeller to turn the shaft of the generator 310. The impeller is preferably located one or two inches above the surface of the vehicle to avoid the boundary layer where the air flow is retarded. The intake ramp to the impeller accelerates the airflow. The rotor blades slow down the airflow. The air exits from the exhaust at approximately the same speed as the air flowing adjacent to the exhaust to avoid air turbulence. Different ways to implement the rotor are possible. The power P obtained from the generator is described by Equation 9 where $C_p$ is the conversion efficiency coefficient, ρ is air density, V is wind speed, and Ra is area of the impeller blades.

$$P=C_p\times\rho/2\times V^3\times Ra \tag{9}$$

The output of the DC generator is routed to charge a battery and a DC-to-DC converter which regulates the output power to 12V, 5V, and 3.3V as required.

The output of the generator is used to charge a rechargeable user replaceable battery pack contained within the radome, and the battery pack is used to power the antennae assembly. Alternatively, a coil and capacitor arrangement such as disclosed in U.S. Pat. No. 5,917,310 may be used in lieu of a rechargeable battery. As mentioned above, a photovoltaic panel array may also be used in addition to or in place of the wind generator to ensure that the battery maintains an adequate charge. Also as mentioned above, an AC power adapter is optionally provided in situations where the vehicle will remain stationary within range of an AC power source, e.g. on a boat moored in a slip, or an RV parked in an RV park.

Another embodiment to provide power to the antennae assembly is to employ a switch circuit which converts a DC power supply inside the vehicle (for example, from the 12 V cigarette lighter) to an AC signal at, e.g. 100 kHz. The switching AC signal is passed through the vehicle window through an inductively coupled or capacitively coupled device. The inductively coupled or capacitively coupled device is attached to the opposite sides of the window at the same position. The inductively coupled or capacitively coupled device allows the electrical energy to be coupled through the window and passed to the antenna assembly on top of the vehicle.

Figure 14:
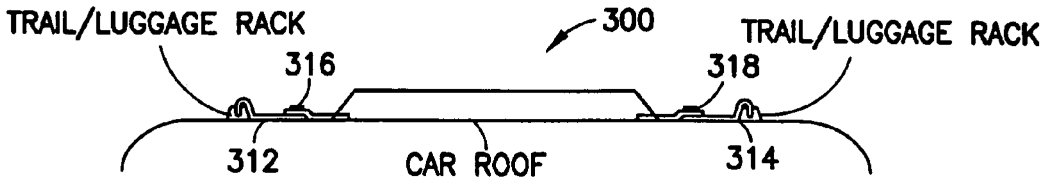
FIG. 14 is a schematic side elevation view illustrating the antennae system of the invention mounted to the roof of a vehicle.
Figure 15:
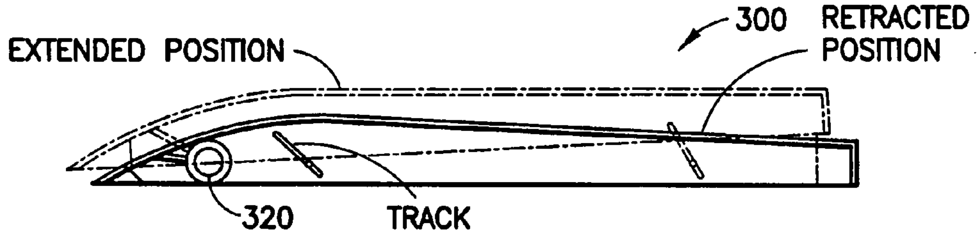
FIG. 15 is a schematic side elevation view illustrating two positions of the retractable radome of the invention.
Figure 16:
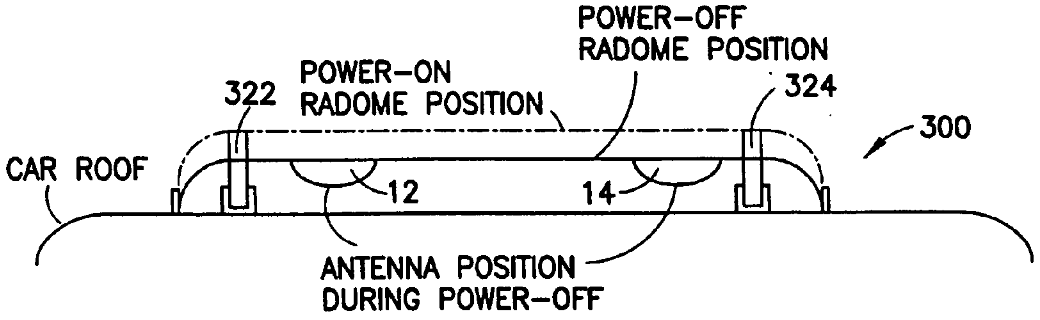
FIG. 16 is a schematic side elevation view illustrating two positions of the retractable radome of the invention with the antennae aimed straight up.

FIGS. 14–16 illustrate preferred aspects of the radome according to the invention. As shown in FIG. 14, mounting brackets 312, 314 located on opposite sides of the radome 300 are adapted to clamp to the vehicle roof rack rail assembly or grip a suitable feature depending on the available mounting points. The clamps employ security locks 316, 318 to protect the unit from unauthorized removal.

FIGS. 15 and 16 illustrate how the radome 300 is extended to an open position when the antennae are being used and collapsed to a closed position when the unit is powered down. In particular, when the unit is powered down, the antennae 12, 14 are moved to a 90° elevation angle as shown in FIG. 16 thereby decreasing the height of the assembly so that the radome can be retracted. The movement of the radome may be accomplished by either an electric motor 320 as shown in FIG. 15 or one or more hydraulic pumps 322, 324 as shown in FIG. 16.

There have been described and illustrated herein several embodiments of a low profile satellite antenna system for mounting on a vehicle. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

The invention claimed is:

1. A tracking system for a vehicle mounted satellite antenna, said tracking system comprising:

a) a yaw sensor;

b) a pitch sensor;

c) a roll sensor; and d) bias correction means coupled to said yaw sensor, said pitch sensor, and said roll sensor, said bias correction means including one of first bias correction means for correcting yaw sensor bias where roll sensor bias has been calibrated to zero, and second bias correction means for correcting yaw sensor bias where pitch sensor bias has been calibrated to zero.

2. A tracking system according to claim 1, wherein:

said first bias correction means includes means for calculating $\{DAz+DEl\ \tan(Az)\tan(El)\}$ where DAz and DEl are antenna correction rates, Az is the azimuth of the antenna, and El is the elevation of the antenna.

3. A tracking system according to claim 2, wherein:

said bias correction means includes pitch sensor bias correction means for calculating pitch sensor bias.

4. A tracking system according to claim 3, wherein:

said pitch sensor bias correction means includes means for calculating $\{DEl\ \sec(Az)\}$.

5. A tracking system according to claim 1, wherein:

said second bias correction means includes means for calculating $\{DAz+DEl\ \cot(Az)\tan(El)\}$ where DAz and DEl are antenna correction rates, Az is the azimuth of the antenna, and El is the elevation of the antenna.

6. A tracking system according to claim 5, wherein:

said bias correction means includes pitch sensor bias correction means for calculating pitch sensor bias.

7. A tracking system according to claim 6, wherein:

said pitch sensor bias correction means includes means for calculating $\{DEl\ \csc(Az)\}$.

8. A tracking system according to claim 1, further comprising:

e) azimuth angle correction means coupled to said yaw sensor, said pitch sensor, and said roll sensor for computing a corrected azimuth angle for said antenna based on input from said sensors.

9. A tracking system according to claim 8, wherein:

said azimuth angle correction means includes means for calculating $\{Az-(fx\cos(Az)\tan(El)+fy\sin(Az)\tan(El)+fz)Dt\}$ where Az is the azimuth of the antenna, El is the elevation of the antenna, fx, fy, fz are derived from the roll, pitch, yaw sensor outputs respectively, and Dt is a time interval.

10. A tracking system according to claim 9, wherein:

fx, fy, fz are the respective roll, pitch, yaw sensor outputs less the estimated bias for each sensor output.

11. A tracking system according to claim 8, further comprising:

f) elevation angle correction means coupled to said yaw sensor, said pitch sensor, and said roll sensor for computing a corrected elevation angle for said antenna based on input from said sensors.

12. A tracking system according to claim 11, wherein:

said elevation angle correction means includes means for calculating $\{El-(-fx\sin(Az)+fy\cos(Az))\ Dt\}$.

13. A tracking system according to claim 12, wherein:

fx, fy, fz are the respective roll, pitch, yaw sensor outputs less the estimated bias for each sensor output.

* * * * *